United States Patent
Duan et al.

(10) Patent No.: US 9,934,074 B2
(45) Date of Patent: *Apr. 3, 2018

(54) SCHEDULING MAPREDUCE TASKS BASED ON ESTIMATED WORKLOAD DISTRIBUTION

(71) Applicant: International Business Machines Corporation, Armonk, NY (US)

(72) Inventors: Ning Duan, Beijing (CN); Liya Fan, Beijing (CN); He Yuan Huang, Beijing (CN); Jian Wang, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,028

(22) Filed: Jun. 1, 2016

(65) Prior Publication Data

US 2017/0060643 A1   Mar. 2, 2017

Related U.S. Application Data

(63) Continuation of application No. 14/982,296, filed on Dec. 29, 2015, now Pat. No. 9,411,645, which is a (Continued)

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/4887* (2013.01); *G06F 2209/5019* (2013.01)

(58) Field of Classification Search
CPC ....................................................... G06F 9/52
(Continued)

(56) References Cited

U.S. PATENT DOCUMENTS 7,913,256 B2 * 3/2011 Torii ..................... G06F 9/4887
718/100
8,732,720 B2 * 5/2014 Verma ................... G06F 9/5066
707/705
(Continued)

FOREIGN PATENT DOCUMENTS

CN   102799436 A   11/2012
CN   103064728 A    4/2013
CN   104112049 B   11/2015

OTHER PUBLICATIONS

Agarwal et al., "Collect information about number of tasks succeeds / total per time unit for a tasktracker", Created May 9, 2009, Updated Aug. 24, 2010, Resolved: Jul. 13, 2009, 5 pages, <https://issues.apache.org/jira/si/jira.issueviews:issue-html/MAPREDUCE-467/MAPREDUCE-467.html>.
(Continued)

*Primary Examiner* — Mehran Kamran
(74) *Attorney, Agent, or Firm* — Gilbert Harmon, Jr.

(57) ABSTRACT

A method for scheduling MapReduce tasks includes receiving a set of task statistics corresponding to task execution within a MapReduce job, estimating a completion time for a set of tasks to be executed to provide an estimated completion time, calculating a soft decision point based on a convergence of a workload distribution corresponding to a set of executed tasks, calculating a hard decision point based on the estimated completion time for the set of tasks to be executed, determining a selected decision point based on the soft decision point and the hard decision point, and scheduling upcoming tasks for execution based on the selected decision point. The method may also include estimating a map task completion time and estimating a shuffle operation completion time. A computer program product and computer system corresponding to the method are also disclosed.

1 Claim, 4 Drawing Sheets

Related U.S. Application Data continuation of application No. 14/835,766, filed on Aug. 26, 2015.

(58) Field of Classification Search
USPC .......................................................... 718/105
See application file for complete search history.

(56) References Cited

U.S. PATENT DOCUMENTS

| | | | | |
|---|---|---|---|---|
| 9,213,584 | B2* | 12/2015 | Cherkasova | G06F 9/5083 |
| 2004/0219920 | A1* | 11/2004 | Love | H04L 1/0002 |
| | | | | 455/442 |
| 2005/0138170 | A1* | 6/2005 | Cherkasova | H04L 41/145 |
| | | | | 709/225 |
| 2009/0300173 | A1* | 12/2009 | Bakman | G06F 11/008 |
| | | | | 709/224 |
| 2009/0319654 | A1* | 12/2009 | Gonzalez | H04L 67/322 |
| | | | | 709/224 |
| 2012/0042319 | A1* | 2/2012 | Hildrum | G06F 9/4881 |
| | | | | 718/104 |
| 2012/0101991 | A1* | 4/2012 | Srivas | G06F 17/30194 |
| | | | | 707/623 |
| 2012/0192197 | A1* | 7/2012 | Doyle | G06F 9/5044 |
| | | | | 718/103 |
| 2012/0198466 | A1* | 8/2012 | Cherkasova | G06F 9/5066 |
| | | | | 718/104 |
| 2012/0284727 | A1* | 11/2012 | Kodialam | G06F 9/4881 |
| | | | | 718/103 |
| 2013/0167151 | A1* | 6/2013 | Verma | G06F 9/5066 |
| | | | | 718/102 |
| 2013/0185147 | A1* | 7/2013 | Letca | G06Q 30/0241 |
| | | | | 705/14.47 |
| 2013/0211550 | A1* | 8/2013 | Lu | G05B 13/04 |
| | | | | 700/19 |
| 2013/0254196 | A1* | 9/2013 | Babu | G06F 17/30595 |
| | | | | 707/736 |
| 2013/0290972 | A1* | 10/2013 | Cherkasova | G06F 9/5066 |
| | | | | 718/103 |
| 2013/0318538 | A1* | 11/2013 | Verma | G06F 9/50 |
| | | | | 718/104 |
| 2013/0346988 | A1* | 12/2013 | Bruno | G06F 9/5066 |
| | | | | 718/102 |
| 2014/0019987 | A1* | 1/2014 | Verma | G06F 9/5038 |
| | | | | 718/103 |
| 2014/0033223 | A1* | 1/2014 | Swart | G06F 9/5066 |
| | | | | 718/105 |
| 2014/0059552 | A1* | 2/2014 | Cunningham | G09G 5/00 |
| | | | | 718/102 |
| 2014/0089727 | A1* | 3/2014 | Cherkasova | G06F 11/3404 |
| | | | | 714/6.13 |
| 2014/0215484 | A1* | 7/2014 | Andrade | G06F 11/3447 |
| | | | | 718/104 |
| 2014/0215487 | A1* | 7/2014 | Cherkasova | G06F 9/5083 |
| | | | | 718/106 |
| 2014/0359624 | A1* | 12/2014 | Cherkasova | G06F 11/3404 |
| | | | | 718/100 |
| 2014/0373023 | A1* | 12/2014 | Arakawa | G06F 9/5083 |
| | | | | 718/103 |
| 2015/0199208 | A1* | 7/2015 | Huang | G06F 9/45533 |
| | | | | 718/1 |
| 2015/0227389 | A1* | 8/2015 | Chin | G06F 9/4881 |
| | | | | 718/106 |
| 2015/0227399 | A1* | 8/2015 | Chin | G06F 12/00 |
| | | | | 718/107 |
| 2015/0331913 | A1* | 11/2015 | Borowiec | H03M 7/3079 |
| | | | | 707/693 |
| 2016/0078069 | A1 | 3/2016 | Tiwari et al. | |

OTHER PUBLICATIONS

Duan et al., "Scheduling MapReduce Tasks Based on Estimated Workload Distribution", U.S. Appl. No. 15/415,910, filed Jan. 26, 2017, 21 pages.

IBM Appendix P, list of patents and patent applications treated as related, Jan. 26, 2017, 2 pages.

Gufler et al., "Load Balancing in MapReduce Based on Scalable Cardinality Estimates", 2012 IEEE 28th International Conference on Data Engineering, pp. 522-533, © 2012 IEEE, DOI 10.1109/ICDE.2012.58, <http://ieeexplore.ieee.org/xpl/articleDetails.jsp?arnumber=6228111>.

Polo et al., "Adaptive MapReduce Scheduling in Shared Environments", pp. 1-6, noted in search report dated Sep. 30, 2014, <http://www.jorditorres.org/wp-content/uploads/2014/05/CCGRID14-JORDA.POLO_.pdf>.

Tian et al., "A Dynamic MapReduce Scheduler for Heterogeneous Workloads", 2009 Eighth International Conference on Grid and Cooperative Computing, pp. 218-224, © 2009 IEEE, DOI 10.1109/GCC 2009.19, <http://hpds.ee.kuas. edu.tw/download/distributed_system/9802/9802final_ppt/TUNG%20YAO%20WEN/A_Dynamic_MapReduce_Scheduler_for_Heterogeneous Workloads.pdf>.

Verma et al., "Deadline-based Workload Management for MapReduce Environments: Pieces of the Performance Puzzle", pp. 1-8, noted in the search report dated Sep. 30, 2014, <http://www.hpl.hp.com/personal/Lucy_Cherkasova/projects/papers/paper-noms2012.pdf>.

Duan et al., "Scheduling Mapreduce Tasks Based on Estimated Workload Distribution", U.S. Appl. No. 14/335,766, filed Aug. 26, 2015, 25 pages.

Duan et al., "Scheduling Mapreduce Tasks Based on Estimated Workload Distribution", U.S. Appl. No. 14/982,296, filed Dec. 29, 2015, 21 pages.

IBM Appendix P, list of patents and patent applications treated as related, Nov. 1, 2016, 2 pages.

Agarwal et al., "Collect information about number of tasks succeeded / total per time unit for a tasktracker", Created May 28, 2009, Updated: Aug. 24, 2010, Resolved: Jul. 13, 2009, 5 pages, <https://issues.apache.org/jira/si/jira.issueviews:issue-html/MAPREDUCE-467/MAPREDUCE-467.html>.

* cited by examiner

SCHEDULING MAPREDUCE TASKS BASED ON ESTIMATED WORKLOAD DISTRIBUTION

BACKGROUND OF THE INVENTION

The present invention relates generally to the field of task scheduling, and more specifically to scheduling MapReduce tasks.

MapReduce is a programming model and an associated implementation for processing and generating large data sets with a parallel, distributed algorithm on a cluster. A MapReduce program is composed of a Map procedure that performs filtering and sorting, and a Reduce procedure that performs a summary operation. A MapReduce system orchestrates the processing by marshalling the distributed servers, running the various tasks in parallel, managing all communications and data transfers between the various parts of the system, and providing for redundancy and fault tolerance. MapReduce systems are therefore responsible for efficiently managing workloads associated with a job.

SUMMARY

As disclosed herein, a method for scheduling MapReduce tasks includes receiving a set of task statistics corresponding to task execution within a MapReduce job, estimating a completion time for a set of tasks to be executed to provide an estimated completion time, calculating a soft decision point based on a convergence of a workload distribution corresponding to a set of executed tasks, calculating a hard decision point based on the estimated completion time for the set of tasks to be executed, determining a selected decision point based on the soft decision point and the hard decision point, and scheduling upcoming tasks for execution based on the selected decision point. The method may also include estimating a map task completion time and estimating a shuffle operation completion time. A computer program product and computer system corresponding to the method are also disclosed.

DETAILED DESCRIPTION

Existing methods for managing MapReduce workloads include allocating heterogeneous hardware resources, allocating additional task slots and processing said slots in parallel, or customizing a partitioned interface to split input data for reduce tasks into more manageable chunks. These methods pose a number of problems, however, such as an inability to achieve an exact load balance, overhead costs associated with parallel processing, and a lack of consistency and accuracy. All of these existing methods make scheduling decisions at different points; some make scheduling decisions after a first map task is finished, and some make scheduling decisions after all map tasks are finished. Scheduling tasks after the first map task is finished creates no delay, but also creates a poor load balance. Scheduling tasks after all map tasks are completed creates a good load balance, but also creates a long delay in the process. Disclosed herein is a method for determining a decision point that optimizes load balance and minimizes delay.

Figure 1:
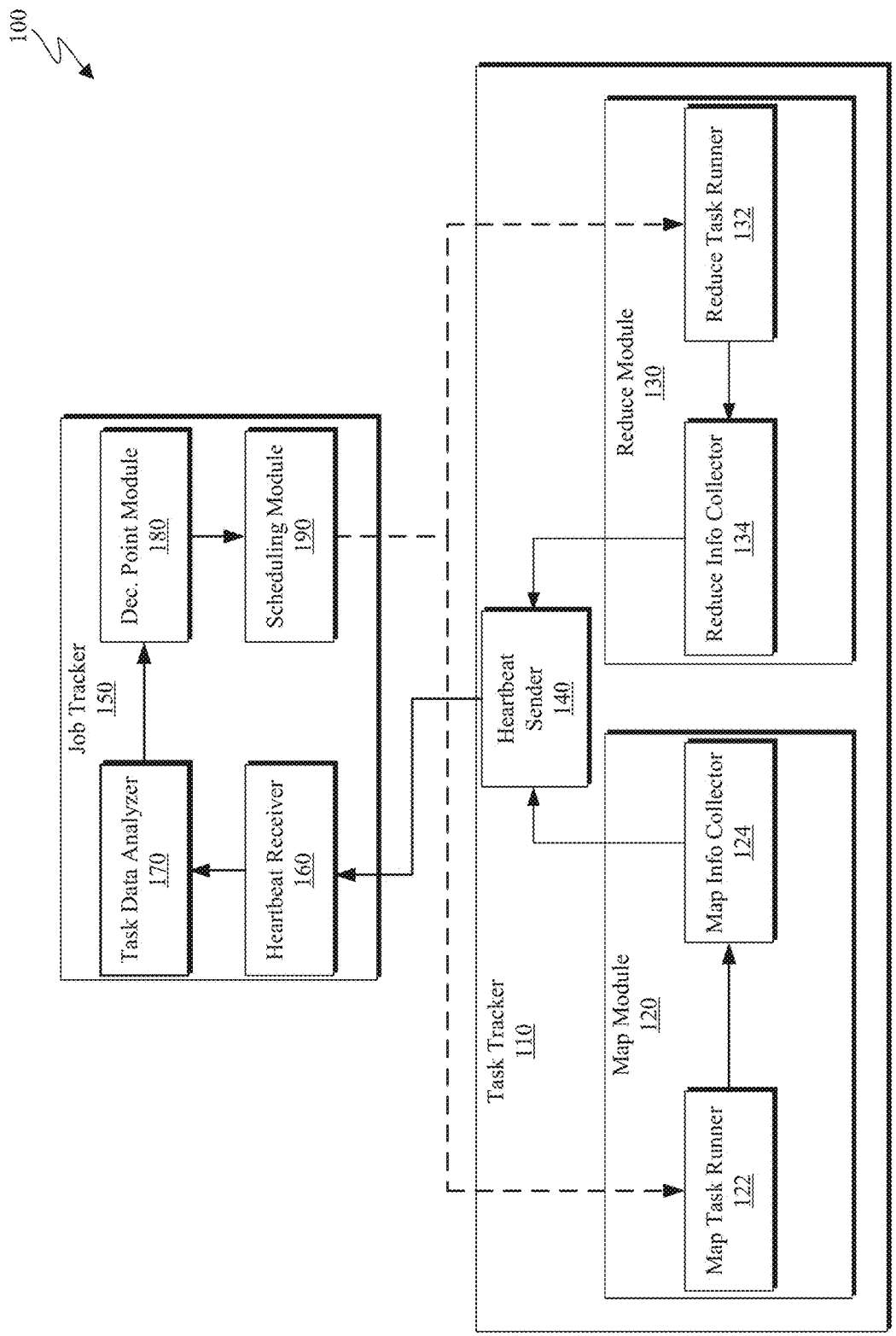
FIG. 1 is a functional block diagram depicting a MapReduce infrastructure in accordance with some embodiments of the present invention.

FIG. 1 is a functional block diagram depicting a MapReduce infrastructure 100 in accordance with some embodiments of the present invention. As depicted, MapReduce infrastructure 100 includes a task tracker 110 and a job tracker 150. MapReduce infrastructure 100 may be utilized to manage a workload associated with MapReduce tasks.

As depicted, task tracker 110 includes a map module 120, a reduce module 130, and a heartbeat sender 140. Each MapReduce job may comprise many individual tasks that task tracker 110 monitors and executes. In particular, map module 120 monitors and executes map tasks and reduce module 130 monitors and executes reduce tasks. Map module 120 includes a map task runner 122 and a map info collector 124. Map task runner 122 is configured to execute map operations corresponding to a task. Map information collector 124 is configured to receive information corresponding to the map operations executed by map task runner 122. In one embodiment, map information collector 124 is configured to monitor map task runner 122 and collect information corresponding to the tasks executed by map task runner 122. Map info collector 124 may also be configured to send information it collects to heartbeat sender 140.

Similarly, reduce module 130 includes a reduce task runner 132 and a reduce info collector 134. Reduce task runner 132 is configured to execute reduce operations corresponding to a task. Reduce information collector 134 is configured to monitor reduce task runner 132 and collect information corresponding to the tasks executed by reduce task runner 132. Reduce information collector 134 may also be configured to send information it collects to heartbeat sender 140.

Heartbeat sender 140 may be configured to receive information regarding the tasks executed by map module 120 and reduce module 130. Heartbeat sender 140 may then extract relevant information and send it to a heartbeat receiver 160 in job tracker 150. The information provided by heartbeat sender 140 may include statistics utilized to calculate a selected decision point. The information provided by heartbeat sender 140 may include any of job input size ($S_{in}$), cluster size (n), average map process rate (r), shuffle data size ($S_{sh}$) and network bandwidth (b).

As depicted, job tracker 150 includes heartbeat receiver 160, task data analyzer 170, decision point module 180, and scheduling module 190. Job tracker 150 is responsible for facilitating the execution of all tasks within a job. Job tracker 150 is configured to receive information corresponding to the tasks executed within task tracker 110, and dynamically schedule upcoming tasks. Heartbeat sender 160 is a module configured to receive information from task tracker 110, specifically from heartbeat sender 140. In some embodiments, heartbeat sender 160 is configured to extract relevant statistics from the information received, and provide said relevant information to task data analyzer 170.

Task data analyzer 170 is configured to analyze data corresponding to the tasks executed by map module 120 and reduce module 130. In some embodiments, task data analyzer 170 receives raw monitoring data and processes said raw data to provide any of job input size ($S_{in}$), cluster size (n), average map process rate (r), shuffle data size ($S_{sh}$) and network bandwidth (b). Task data analyzer 170 provides relevant task statistics to a decision point module 180.

Decision point module 180 is configured to receive relevant task statistics from task data analyzer 170. In some embodiments, decision point module 180 processes task statistics to provide a selected decision point for scheduling tasks to a scheduling module 190. Decision point module 180 is discussed in further detail with respect to FIG. 2.

Scheduling module 190 is configured to receive a selected decision point from decision point module 180. Based on the received selected decision point, scheduling module 190 then schedules tasks for execution in map module 120 and reduce module 130. Scheduling module 190 provides a task schedule to both map task runner 122 and reduce task runner 132. Reduce task runner 132 and map task runner 122 then execute tasks according to the received schedule, and the process begins again.

Figure 2:
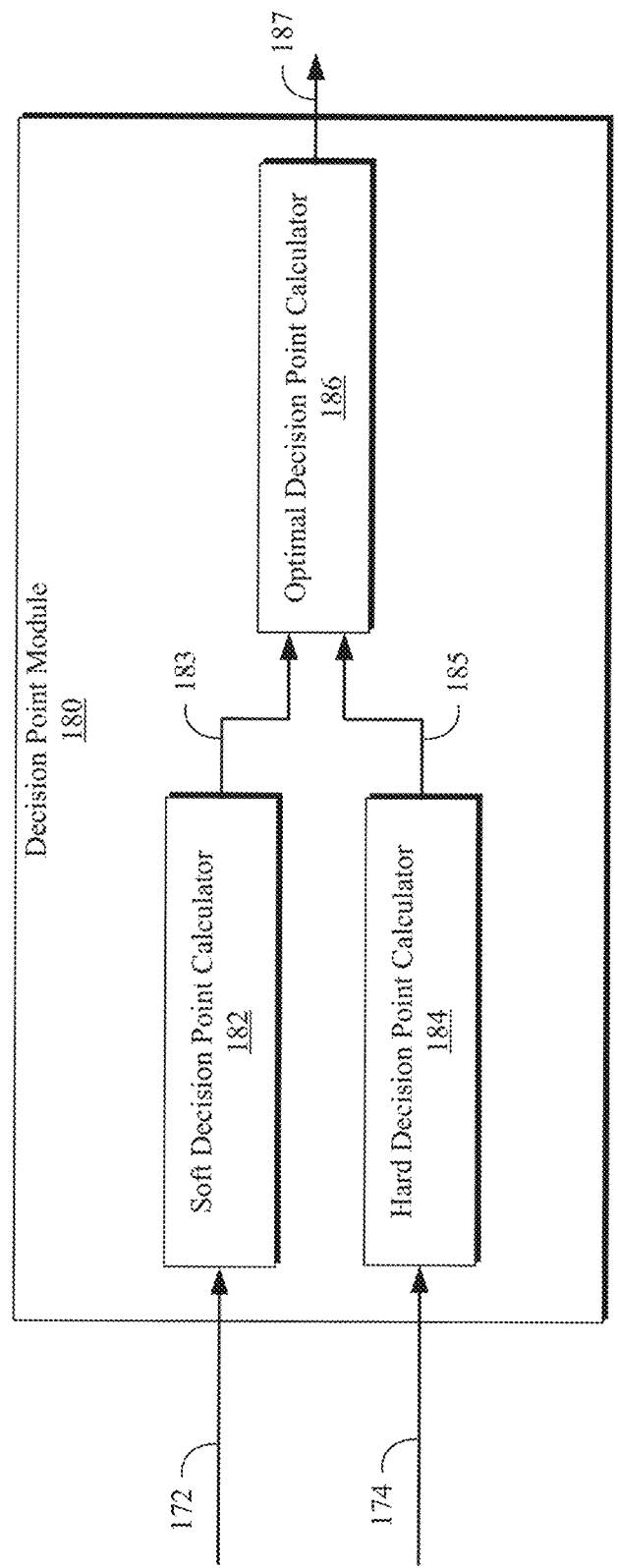
FIG. 2 is a functional block diagram depicting a decision point module in accordance with some embodiments of the present invention.

FIG. 2 is a functional block diagram depicting a decision point module 180 in accordance with some embodiments of the present invention. As depicted, decision point module 180 includes a soft decision point calculator 182, a hard decision point calculator 184, and an optimal decision point calculator 186. Decision point module 180 may be capable of determining a scheduling decision point for a MapReduce job that enables a best achievable workload balance without delaying the progress of the overall job.

Soft decision point calculator 182 may be configured to determine a soft decision point based on the convergence of workload distribution. Soft decision point calculator 182 receives task statistics 172 compiled by a data analyzer. In one embodiment, task statistics 172 include any of job input size ($S_{in}$), cluster size (n), average map process rate (r), shuffle data size ($S_{sh}$) and network bandwidth (b). Soft decision point calculator 182 is configured to process task statistics 172 to provide a soft decision point 183. The specifics of the processing carried out by soft decision point calculator 182 are discussed with respect to operational step 340 of FIG. 3.

Hard decision point calculator 184 may be configured to determine a hard decision point based on the estimated completion time of the job. Hard decision point calculator 184 receives task statistics 174 compiled by a data analyzer. In some embodiments, task statistics 174 include any of job input size ($S_{in}$), cluster size (n), average map process rate (r), shuffle data size ($S_{sh}$) and network bandwidth (b). In some embodiments, task statistics 174 are the same as task statistics 172. In other embodiments, task statistics 172 and task statistics 174 are different subsets of the data analyzed by a data analyzer. Hard decision point calculator 184 is configured to process task statistics 174 to provide a hard decision point 185. The specifics of the processing carried out by hard decision point calculator 184 are discussed with respect to operational step 330 of FIG. 3.

Optimal decision point calculator 186 may be configured to determine a decision point that enables an optimal workload distribution without delaying the overall progress of the job. Optimal decision point calculator 186 receives soft decision point 183 and hard decision point 185. Optimal decision point calculator 186 is configured to process soft decision point 183 and hard decision point 185 to provide a selected decision point 187. The specifics of the processing carried out by optimal decision point calculator 186 are discussed with respect to operational step 350 of FIG. 3. In some embodiments, optimal decision point calculator 186 is configured to provide selected decision point 187 to a scheduling module, such as scheduling module 190 depicted in FIG. 1.

Figure 3:
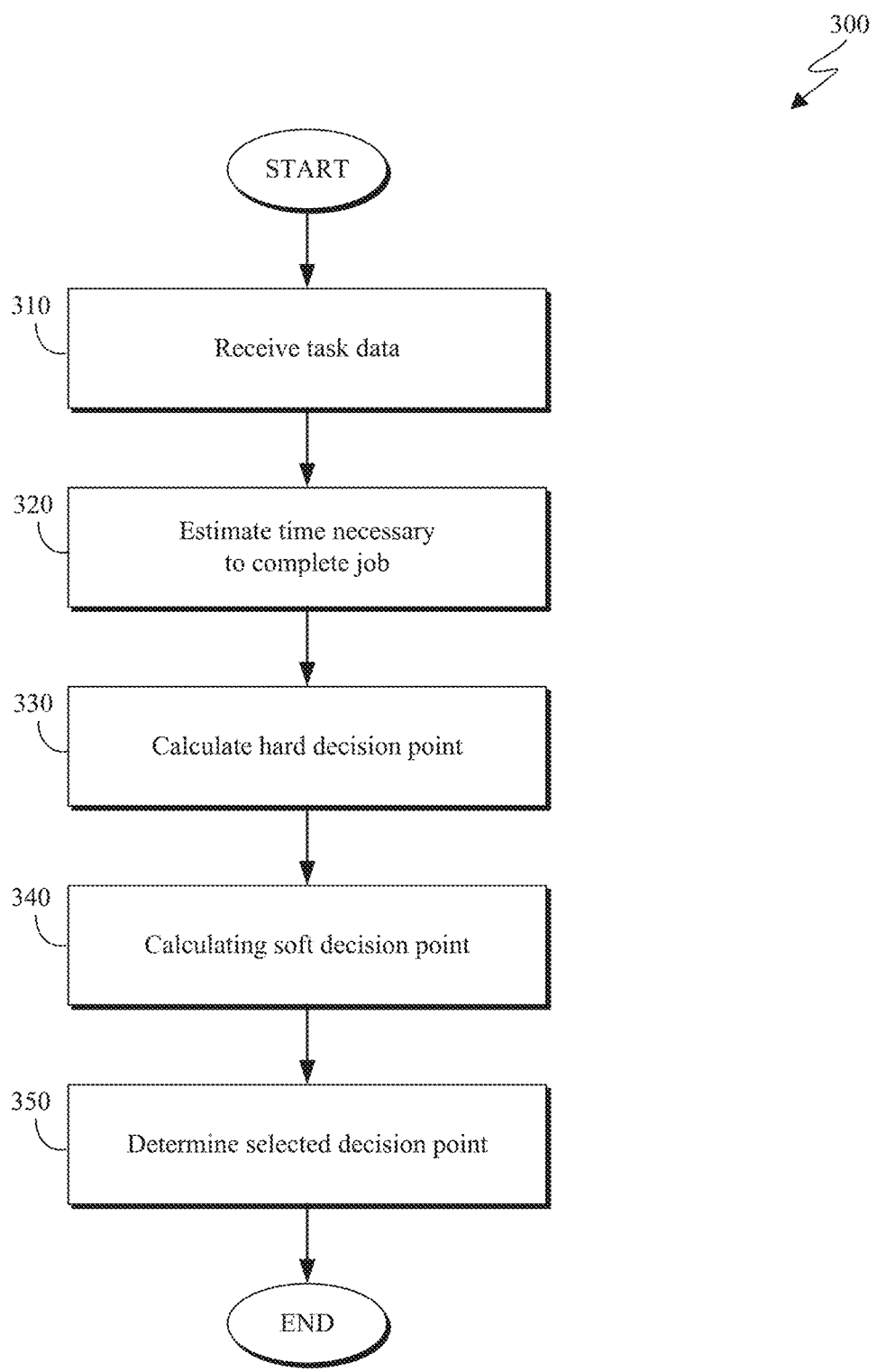
FIG. 3 is a flowchart depicting a decision point selection method in accordance with one embodiment of the present invention.

FIG. 3 is a flowchart depicting a decision point selection method 300 in accordance with one embodiment of the present invention. As depicted, decision point selection method 300 includes receiving (310) task data, estimating (320) how much time is necessary to complete a job, calculating (330) a hard decision point, determining (340) a soft decision point, and determining (350) a selected decision point. Decision point selection method 300 may be used to determine a scheduling decision point that optimizes workload balance without delaying the progress of the overall job.

Receiving (310) job data may include receiving statistics corresponding to a job of interest as well as data corresponding to tasks within the job. The statistics collected may include the job input size ($S_{in}$), cluster size (n), average map process rate (r), shuffle data size ($S_{sh}$) and network bandwidth (b). The statistics may be received from a task data analyzer, such as is depicted in FIG. 1. In some embodiments, the statistics may be included in heartbeat that is sent from a heartbeat sender to a heartbeat receiver.

Estimating (320) how much time is necessary to complete a job may include processing some of the received job data to calculate an estimated completion time corresponding to the job. In one embodiment, the estimated completion time for the job may include the time required to complete all necessary map tasks associated with the job in addition to the necessary shuffle time. The map task completion time ($t_m$) may be calculated according to the equation $t_m = S_{in}/(n*r)$. The shuffle completion time ($t_s$) may be calculated according to the equation $t_s = S_{sh}/(n*b)$. The map task finishing time and the shuffle completion time may then be utilized to calculate a hard decision point.

Calculating (330) a hard decision point may include using an estimated task completion time to calculate a hard decision point. The estimated task completion time may be calculated according to a map task completion time and the shuffle completion time. In one embodiment, the hard decision point (HDP) is calculated according to the equation $HDP = \max\{0, t_m - t_s\}$. The hard decision point represents the earliest point after which the job's overall progress will be delayed.

Determining (340) a soft decision point may include identifying a point at which workload distributions remain relatively constant. Whenever a map task is completed, the statistics corresponding to the task are updated. From the updated statistics, a workload distribution can be derived. When the workload distribution exhibits relatively little change after the completion of multiple map tasks, the workload distribution has converged, and the soft decision point has been identified.

Determining (350) a selected decision point may include determining a decision point ($P_O$) based on the hard decision point and the soft decision point. In one embodiment, the selected decision point is calculated according to the equation $P_O = \min\{SDP, HDP\}$. By determining the decision point in this manner, the scheduling decisions will be made at the best workload distribution achievable without delaying the overall progress of the job. Once a decision point is selected and reached, a schedule module, such as scheduling module 190 depicted in FIG. 1, may be initiated to begin scheduling tasks.

Figure 4:
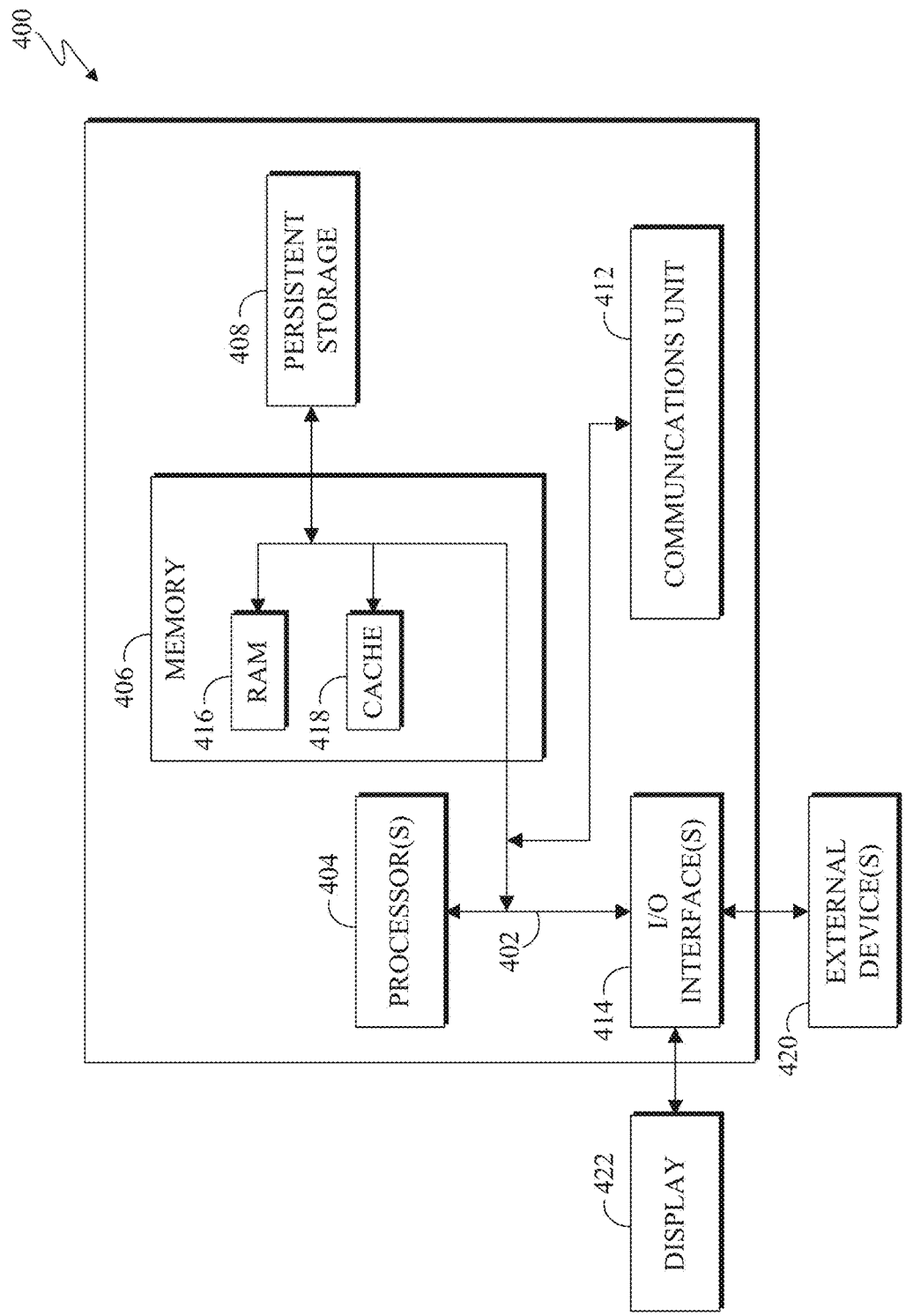
FIG. 4 depicts a functional block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
   one or more computer readable storage media and program instructions stored on the one or more computer readable storage media, the program instructions comprising instructions to:
   receive a set of task statistics corresponding to task execution within a MapReduce job, wherein the set of task statistics includes a job input size, a cluster size, an average map process rate, a shuffle data size, a network bandwidth, and a convergence of a workload distribution corresponding to the set of executed tasks;
   estimate a completion time corresponding to a map task completion time and a shuffle operation completion time to provide an estimated completion time;
   calculate a soft decision point based on a convergence of a workload distribution corresponding to a set of executed tasks, wherein the soft decision point corresponds to a point at which a workload is most evenly distributed among available resources;
   calculate a hard decision point according to the equation HDP=max {0, map task completion time−shuffle operation completion time};
   determine a selected decision point based on the soft decision point and the hard decision point, wherein the selected decision point is the lesser of the soft decision point and the hard decision point; and
   schedule and execute a next set of tasks at the selected decision point.

* * * * *